United States Patent
Cui et al.

(10) Patent No.: US 11,291,004 B2
(45) Date of Patent: Mar. 29, 2022

(54) METHOD AND DEVICE FOR ACCESSING 5G NETWORK, AND NON-TRANSITORY COMPUTER READABLE STORAGE MEDIUM

(71) Applicant: BEIJING XIAOMI MOBILE SOFTWARE CO., LTD., Beijing (CN)

(72) Inventors: Hengbin Cui, Beijing (CN); Long Sun, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 80 days.

(21) Appl. No.: 16/743,127

(22) Filed: Jan. 15, 2020

(65) Prior Publication Data

US 2021/0092742 A1    Mar. 25, 2021

(30) Foreign Application Priority Data

Sep. 24, 2019 (CN) .......................... 201910904611.1

(51) Int. Cl.
| | |
|---|---|
| H04L 12/28 | (2006.01) |
| H04W 72/04 | (2009.01) |
| H04W 76/27 | (2018.01) |
| H04W 48/16 | (2009.01) |
| H04W 72/02 | (2009.01) |
| H04W 72/08 | (2009.01) |

(Continued)

(52) U.S. Cl.
CPC ....... *H04W 72/0453* (2013.01); *H04W 48/16* (2013.01); *H04W 72/02* (2013.01); *H04W 72/048* (2013.01); *H04W 72/085* (2013.01); *H04W 72/10* (2013.01); *H04W 76/27* (2018.02)

(58) Field of Classification Search
CPC .............. G01B 9/02004; H04J 11/0069; H04J 11/0073; H04W 56/001; H04W 60/00; H04W 8/06; H04W 8/065; H04W 48/18; H04W 48/16; H04L 41/0806
USPC ................................ 370/252, 329, 430, 503
See application file for complete search history.

(56) References Cited

U.S. PATENT DOCUMENTS

| | | | |
|---|---|---|---|
| 10,779,230 B1* | 9/2020 | Sethi | H04W 36/16 |
| 2016/0119858 A1* | 4/2016 | Liu | H04W 36/00837 |
| | | | 455/434 |

(Continued)

FOREIGN PATENT DOCUMENTS

CN    101980571 B    12/2014

OTHER PUBLICATIONS

Supplementary European Search Report dated May 20, 2020 in corresponding European application No. 20153416.1, 11 pages.

(Continued)

*Primary Examiner* — John Pezzlo
(74) *Attorney, Agent, or Firm* — Oblon, McClelland, Maier & Neustadt, L.L.P.

(57) ABSTRACT

The disclosure relates to a method, a device, and a computer-readable storage medium for accessing a 5G network. The method includes acquiring frequency point information by performing frequency point scanning in an operating band belonging to an operator of the 5G network; selecting a 5G-supported frequency point used by the operator from the frequency point information; and performing a cell registration process through a cell with the 5G-supported frequency point to access the 5G network.

18 Claims, 6 Drawing Sheets

(51) Int. Cl.
*H04W 72/10* (2009.01)
*H04J 1/16* (2006.01)

(56) References Cited

U.S. PATENT DOCUMENTS

2016/0183174 A1* 6/2016 Xie ...................... H04W 48/12
                                                    455/436
2017/0374635 A1* 12/2017 Islam .................... H04W 76/19
2018/0227839 A1   8/2018 Wang et al.
2019/0253959 A1*  8/2019 Wei ...................... H04W 48/16

OTHER PUBLICATIONS

"3rd Generation Partnership Project; Technical Specification Group Radio Access Network; NR; User Equipment (UE)procedures in Idle mode and RRC Inactive state (Release 15)", 3GPP Draft; 38304-F40, 3rd Generation Partnership Project (3GPP), Jun. 29, 2019, XP051754809, 28 pages.

* cited by examiner

METHOD AND DEVICE FOR ACCESSING 5G NETWORK, AND NON-TRANSITORY COMPUTER READABLE STORAGE MEDIUM

CROSS-REFERENCE TO RELATED APPLICATIONS

This application is based on and claims priority to Chinese Patent Application No. 201910904611.1, filed on Sep. 24, 2019, the entire contents of which are incorporated herein by reference.

BACKGROUND 5G new radio (NR) is a 5G standard for a new Orthogonal Frequency Division Multiplexing (OFDM)-based air interface. 5G NR is introduced relative to a 5G core network. In the 5G era, the NR and the core network each evolves to 5G independently. The evolution of 5G NR architecture is divided into non-standalone (NSA) and standalone (SA). At present, the domestic 5G NSA uses a 4G core network and an LTE and 5G NR dual connection, that is, uses the existing LTE network to deploy 5G, so as to meet the needs of rapid 5G deployment.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a method for accessing a fifth generation (5G) network, implemented by a terminal. The method includes acquiring frequency point information by performing frequency point scanning in an operating band belonging to an operator of the 5G network; selecting a 5G-supported frequency point used by the operator from the frequency point information; and performing a cell registration process through a cell with the 5G-supported frequency point to access the 5G network.

In an example, when selecting the 5G-supported frequency point used by the operator from the frequency point information, the method further includes selecting a scanned frequency point having maximum signal energy from the frequency point information to perform the cell registration process through a cell with the selected frequency point to access the 5G network.

According to an aspect, the method further includes generating a frequency point list; and adding a 5G-supported frequency point used by each operator to the frequency point list.

According to another aspect, the method further includes setting a scanning priority of a band comprising the 5G-supported frequency point and belonging to the operator to high.

According to yet another aspect, the method further includes, after accessing the 5G network, acquiring a 5G-supported frequency point used for accessing the 5G network; and updating a frequency point list based on the acquired 5G-supported frequency point.

According to yet another aspect, the method further includes acquiring the 5G-supported frequency point used by the operator from the frequency point list through a radio resource control (RRC) module of the terminal.

Aspects of the disclosure also provide a device for accessing a fifth generation (5G) network, located in a terminal. The device includes a processor and a memory configured to store instructions executable by the processor. The processor is configured to acquire frequency point information by performing frequency point scanning in an operating band belonging to an operator of the 5G network; select a 5G-supported frequency point used by the operator from the frequency point information; and perform a cell registration process through a cell with the 5G-supported frequency point to access the 5G network.

Aspects of the disclosure also provide a non-transitory computer-readable storage medium storing instructions that, when executed by a processor of a mobile terminal that is configured to access a 5G network, cause the mobile terminal to acquire frequency point information by performing frequency point scanning in an operating band belonging to an operator of the 5G network; select a 5G-supported frequency point used by the operator from the frequency point information; and perform a cell registration process through a cell with the 5G-supported frequency point to access the 5G network.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate aspects consistent with the present disclosure and, together with the description, serve to explain the principles of the present disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of exemplary aspects do not represent all implementations consistent with the present disclosure. Instead, they are merely examples of devices and methods consistent with aspects related to the present disclosure as recited in the appended claims.

The current domestic 5G NSA uses a 4G core network, uses an LTE and 5G NR dual connection manner, and uses the existing LTE network to deploy 5G, so as to meet the needs of rapid 5G deployment. At present, LTE bands of the domestic 5G NSA network operators only support Band 3+NXX, so if the mobile phone is registered in a cell with a band other than Band 3, it will access the 5G network slowly, and may not even access the 5G network.

When a terminal (such as a mobile phone commonly used) is powered on to access the network or re-accesses the network after being disconnected, it usually cannot quickly access the 5G network, which affects the customer experience.

The present disclosure provides a method for accessing a 5G network. The method is particularly applicable to 5G NSA architecture because the problem of low network speed occurs when the mobile phone accesses the 5G network in the 5G NSA architecture. In the method, when a mobile phone is powered on to access a network or re-accesses the network after being disconnected, a 5G-supported frequency point used by an operator is preferentially selected from frequency points scanned by the mobile phone, and a cell registration process is performed through a cell with the 5G-supported frequency point, so that the mobile phone can quickly access a 5G network.

In addition, in this method, the scanning priority of a band including a 5G-supported frequency point used by an operator and belonging to the operator is set to high, so that the mobile phone can scan available 5G-supported frequency points as soon as possible, thereby speeding up network access.

The terminal mentioned here is a terminal that can access the 5G network through a SIM card, such as a mobile phone, a PAD and a wearable device. The mobile phone is taken as an example to explain the method of the present disclosure.

Figure 1:
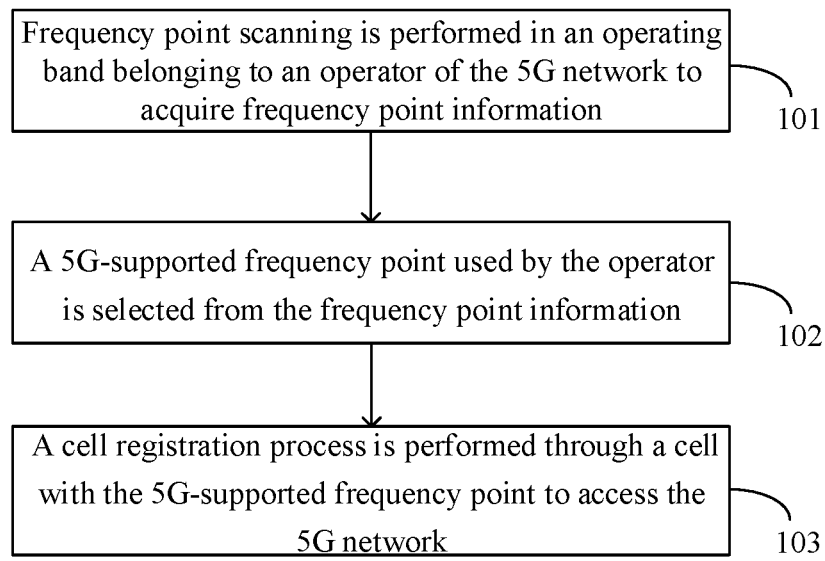
FIG. 1 illustrates a flowchart of a method for accessing a 5G network according to an exemplary aspect of the present disclosure.

FIG. 1 illustrates a flowchart of a method for accessing a 5G network according to an exemplary aspect of the present disclosure. As illustrated in FIG. 1, the method is applied to a terminal. The method includes the following operations as illustrated in blocks 101-103.

At block 101, frequency point scanning is performed in an operating band of an operator of the 5G network, and frequency point information scanned in the operating band is acquired.

At block 102, a 5G-supported frequency point used by the operator is selected from the frequency point information.

At block 103, a cell registration process is performed through a cell with the 5G-supported frequency point to access the 5G network.

The above operations may be performed when the mobile phone is powered on to access the 5G network, or may be performed when the mobile phone re-accesses the 5G network after no service.

At block 101, a cell search is required to be performed when the mobile phone is powered on or disconnected from the network, that is, a center frequency point of a possible cell is scanned. If an available center frequency point is scanned, a signal is received at the center frequency point, and the received signal strength is used to judge whether a cell may exist around the frequency point, that is, judge whether the frequency point is actually available.

When accessing the network, a frequency point is selected from the scanned available frequency points for cell registration to access the 5G network. Performing a cell registration process through a cell with a 5G-supported frequency point means that after a 4G normal registration is performed through the 5G-supported frequency point, since the registered cell supports a 5G capability, the network will query the 5G capability during the mobile phone registration process, and then a 5G cell is configured and registered. Therefore, the cell registration process is performed through the cell with the 5G-supported frequency point, so that the mobile phone can quickly access the 5G network.

At block 102, specifically, after scanning a band, a 5G-supported frequency point is selected from the acquired frequency point information. If a 5G-supported frequency point is found in the frequency point information acquired by scanning the band, cell registration may be performed at the frequency point. If no 5G-supported frequency point is found in the frequency point information acquired by scanning the band, the scanning of a next band is continued. It can be seen that as the band including the 5G-supported frequency point is scanned earlier, the 5G network may be accessed sooner.

In this method, the mobile phone selects the 5G-supported frequency point used by the operator from the scanned frequency points for cell registration to quickly access the 5G network.

In an exemplary aspect of the present disclosure, the operation of selecting a 5G-supported frequency point used by the operator from the frequency point information includes that:

a scanned frequency point having maximum signal energy is selected from the frequency point information to perform a cell registration process through a cell with the selected frequency point to access the 5G network.

When multiple 5G-supported frequency points are scanned by the mobile phone, a frequency point with the maximum signal energy is selected from the multiple 5G-supported frequency points to perform the cell registration process.

In this method, the mobile phone needs to acquire a 5G-supported frequency point used by the operator in advance, as described in the following implementations.

In an exemplary aspect of the present disclosure, in a case that it is immediately after the terminal is powered on, the method further includes that:

a 5G-supported frequency point used by the operator is acquired.

The operation described in this implementation is performed immediately after the mobile phone is started. This is because when the mobile phone is disconnected from the network, the mobile phone has already obtained the 5G-supported frequency point used by the operator when it was previously started, so there is no need to acquire it again.

Various operators are assigned with different 5G-supported frequency points. When the mobile phone uses a SIM card of an operator to access the 5G network, it is necessary to acquire the 5G-supported frequency point corresponding to the operator according to the operator in order to be able to select the 5G-supported frequency point from the scanned frequency points.

When the mobile phone is powered on and disconnected from the network for network re-access, information of an operator to which a SIM card belongs may be obtained by reading information of the SIM card. The information of the operator may be acquired in a manner in the related art, and details are not described herein again. Then, a 5G-supported frequency point used by the operator is acquired based on the information of the operator. The specific acquisition manner is described in detail below.

In addition, in order to enable the 5G-supported frequency point to be scanned by the mobile phone as soon as possible, the priorities of bands to be scanned by the mobile phone may be set.

In an exemplary aspect of the present disclosure, the method further includes that:

a 5G-supported frequency point used by each operator is added to a frequency point list.

A frequency point list may be set in a configuration file of the mobile phone. A 5G-supported frequency point used by each operator may be acquired in advance, and the 5G-supported frequency points may be added to the frequency point list so that the 5G-supported frequency point used by the operator can be acquired from the frequency point list. In the list, operators and their corresponding 5G-supported frequency points are marked. When the mobile phone obtains the information of the operator based on the read SIM card information, the mobile phone searches for a 5G-supported frequency point used by the operator in the frequency point list based on the information of the operator.

In an exemplary aspect of the present disclosure, the method further includes that:

a 5G-supported frequency point used by the operator is acquired from the frequency point list through an RRC module of the terminal.

Specifically, when the mobile phone needs to acquire 5G-supported frequency points in order to select the 5G-supported frequency points from the frequency point information, a frequency point list is acquired from the configuration file of the mobile phone through an RRC module of the mobile phone. It should be noted that the 5G-supported frequency points in the frequency point list are not necessarily all the 5G-supported frequency points used by the operator. During the use of the mobile phone, the mobile phone may store information of the 5G-supported frequency point acquired through the registered cell with a 5G frequency point each time it accesses the network in the frequency point list to supplement the frequency points in the list.

In an exemplary aspect of the present disclosure, the method further includes that:

a scanning priority of a band including the 5G-supported frequency point and belonging to the operator is set to high.

In order to enable the mobile phone to scan the 5G-supported frequency point as soon as possible during frequency scanning, the priority of an operating band of the operator scanned by the mobile phone needs to be set, that is, the scanning priority of a band including the 5G-supported frequency point is set to high, so that the mobile phone can scan the 5G-supported frequency point faster.

Firstly, based on operator information acquired through SIM card information, a band assigned to the operator and including the 5G-supported frequency point is determined. The band assigned to the operator and including the 5G-supported frequency point may also be stored in a system file of the mobile phone, so that the mobile phone may search based on the operator, for example, it may be stored in the frequency point list mentioned above.

It should be noted that in the current 5G based on NSA architecture, the band assigned to each operator and including the 5G-supported frequency point is an LTE-based band 3. That is, at the current stage, the band including the 5G-supported frequency point of each operator is a band 3. However, in the future, bands including the 5G-supported frequency point may also be extended to other bands, such as band 1 and band 8. The division and assignment of bands for various operators are available to those skilled in the art, and are not repeated here.

Therefore, at this stage, the band including the 5G-supported frequency point and belonging to the operator is actually a band 3.

Generally, the scanning priority of the band including the 5G-supported frequency point is set to the highest. At this stage, the scanning priority of the band 3 is set to the highest priority. If there are multiple bands including the 5G-supported frequency point in the future, the scanning priorities of the bands may be set to high.

In an exemplary aspect of the present disclosure, the method further includes that:

the scanned frequency point information includes scanned frequency points and signal energies corresponding to the scanned frequency points.

When no 5G-supported frequency point is scanned, a scanned frequency point having maximum signal energy is selected to perform a cell registration process to access the 5G network.

In some cases, the scanned frequency points may not include the 5G-supported frequency point in the frequency point list. In this case, a frequency point having maximum signal energy is selected, and a cell registration process is performed through a cell with the frequency point to finally access the 5G network.

The cell with the selected frequency point mentioned herein refers to a cell using the frequency point as a center frequency point.

In an exemplary aspect of the present disclosure, the method further includes that:

after accessing the 5G network, a 5G-supported frequency point used for accessing the 5G network is acquired: and the frequency point list is updated based on the 5G-supported frequency point.

When the mobile phone does not scan the same frequency point as the 5G-supported frequency point in the frequency point list, and after registering a 5G cell through another frequency point, the frequency point list may be updated based on the another frequency point (center frequency point) corresponding to the 5G cell. That is, a new acquired 5G-supported frequency point is added to the frequency point list.

The above implementation indicates that when the acquired 5G-supported frequency point (for example, in the frequency point list) is not scanned, by normal registration, it may also access the 5G network. Moreover, in the case of accessing the 5G network, the frequency point list is updated based on the new acquired 5G-supported frequency point, which can supplement the 5G-supported frequency points in the frequency point list, so that the mobile phone can access the 5G network faster in the subsequent access process.

Figure 2:
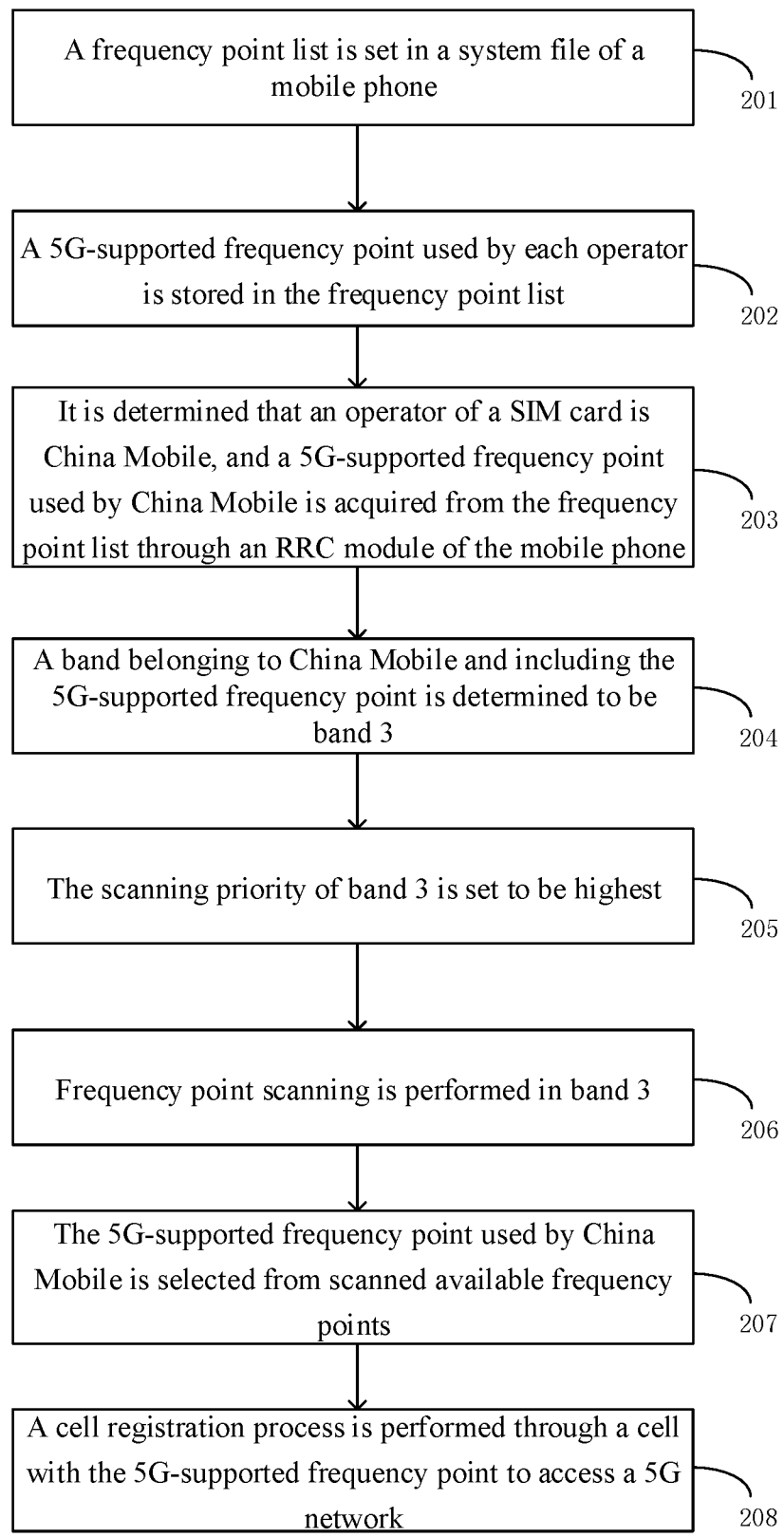
FIG. 2 illustrates a flowchart of a method for accessing a 5G network according to an exemplary aspect of the present disclosure.

FIG. 2 illustrates a specific aspect according to the present disclosure. The terminal is a mobile phone, and an implementation scenario of this aspect is that the mobile phone is powered on to access the network. As illustrated in FIG. 2, the method for accessing a 5G network based on this aspect includes the following operations as illustrated in blocks 201-208.

At block 201, a frequency point list is set in a system file of a mobile phone.

At block 202, a 5G-supported frequency point used by each operator is stored in the frequency point list.

At block 203, after the mobile phone is started, it is determined from information of a SIM card in the mobile phone that an operator of the SIM card is China Mobile, and a 5G-supported frequency point used by China Mobile is acquired from the frequency point list through an RRC module of the mobile phone.

At block 204, a band belonging to China Mobile and including the 5G-supported frequency point is determined as band 3.

At block 205, the scanning priority of band 3 is set to the highest priority.

At block 206, frequency point scanning is performed in band 3.

At block 207, the 5G-supported frequency point used by China Mobile is selected from scanned available frequency points.

At block 208, a cell registration process is performed through a cell with the 5G-supported frequency point to access a 5G network.

Figure 3:
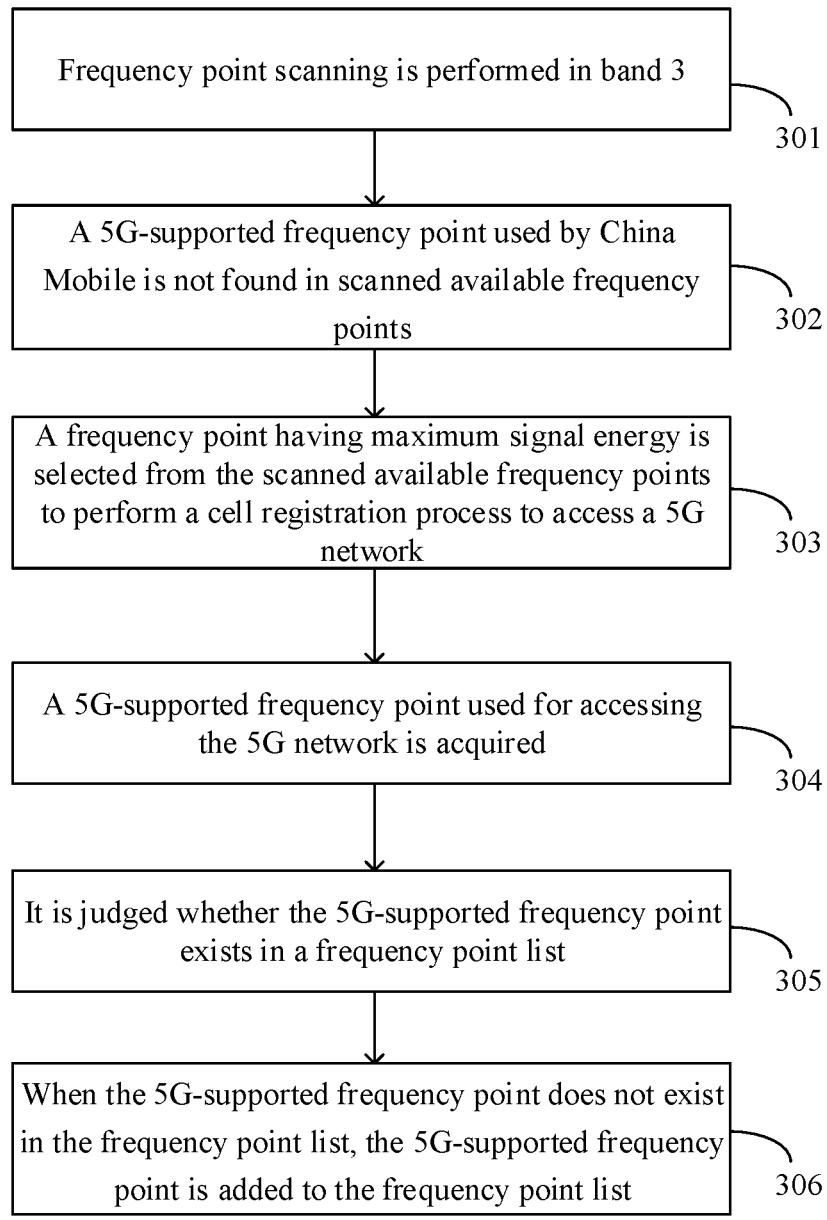
FIG. 3 illustrates a flowchart of a method for accessing a 5G network according to an exemplary aspect of the present disclosure.

FIG. 3 illustrates another specific aspect according to the present disclosure. The terminal is a mobile phone, and an implementation scenario of this aspect is that the mobile phone re-accesses the network after being disconnected from the network, and a network operator is China Mobile. As illustrated in FIG. 3, the method for accessing a 5G network based on this aspect includes the following operations as illustrated in blocks 301-306.

At block 301, frequency point scanning is performed in band 3.

At block 302, a 5G-supported frequency point used by China Mobile is not found in scanned available frequency points.

At block 303, a frequency point having maximum signal energy is selected from the scanned available frequency points to perform a cell registration process to access a 5G network.

At block 304, a 5G-supported frequency point used for accessing the 5G network is acquired.

At block 305, it is judged whether the 5G-supported frequency point exists in a frequency point list.

At block 306, when the 5G-supported frequency point does not exist in the frequency point list, the 5G-supported frequency point is added to the frequency point list.

In the case where the mobile phone re-accesses the network after being disconnected from the network illustrated in FIG. 3, since a 5G-supported frequency point used by an operator has been obtained and a band including the 5G-supported frequency point and belonging to the operator has been determined before accessing the network previously, the above operation does not need to be performed.

Figure 4:
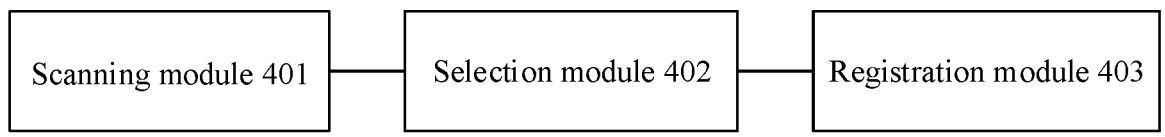
FIG. 4 illustrates a block diagram of a device for accessing a 5G network according to an exemplary aspect of the present disclosure.

The present disclosure also provides a device for accessing a 5G network, applied to a terminal. As illustrated in FIG. 4, the device includes a scanning module 401, a selection module 402 and a registration module 403.

The scanning module 401 is configured to perform frequency point scanning in an operating band belonging to an operator of the 5G network, and acquire frequency point information scanned in the operating band;

The selection module 402 is configured to select a 5G-supported frequency point used by the operator from the frequency point information; and The registration module 403 is configured to perform a cell registration process through a cell with the 5G-supported frequency point to access the 5G network.

In an exemplary aspect of the present disclosure, the selection module is further configured to:

select a scanned frequency point having maximum signal energy from the frequency point information to perform a cell registration process through a cell with the selected frequency point to access the 5G network.

In an exemplary aspect of the present disclosure n, the device further includes:

a frequency point list generation module, configured to generate a frequency point list, and add a 5G-supported frequency point used by each operator to the frequency point list.

In an exemplary aspect of the present disclosure, the device further includes:

a priority setting module, configured to set a scanning priority of a band including the 5G-supported frequency point and belonging to the operator to high.

In an exemplary aspect of the present disclosure, the device further includes:

an update module, configured to acquire, after accessing the 5G network, a 5G-supported frequency point used for accessing the 5G network, and update a frequency point list based on the 5G-supported frequency point.

In an exemplary aspect of the present disclosure, the device further includes:

a frequency point acquisition module, configured to acquire a 5G-supported frequency point used by the operator from the frequency point list through an RRC module of the terminal.

With regard to the device in the above aspects, the specific manner in which the respective modules perform the operations has been described in detail in the aspect relating to the method, and will not be explained in detail herein.

By adopting the method provided by the present disclosure, when a mobile phone is powered on to access a network or re-accesses the network after being disconnected, a 5G-supported frequency point used by an operator is preferentially selected from frequency points scanned by the mobile phone, and a cell registration process is performed through a cell with the 5G-supported frequency point, so that the mobile phone can quickly access a 5G network.

Figure 5:
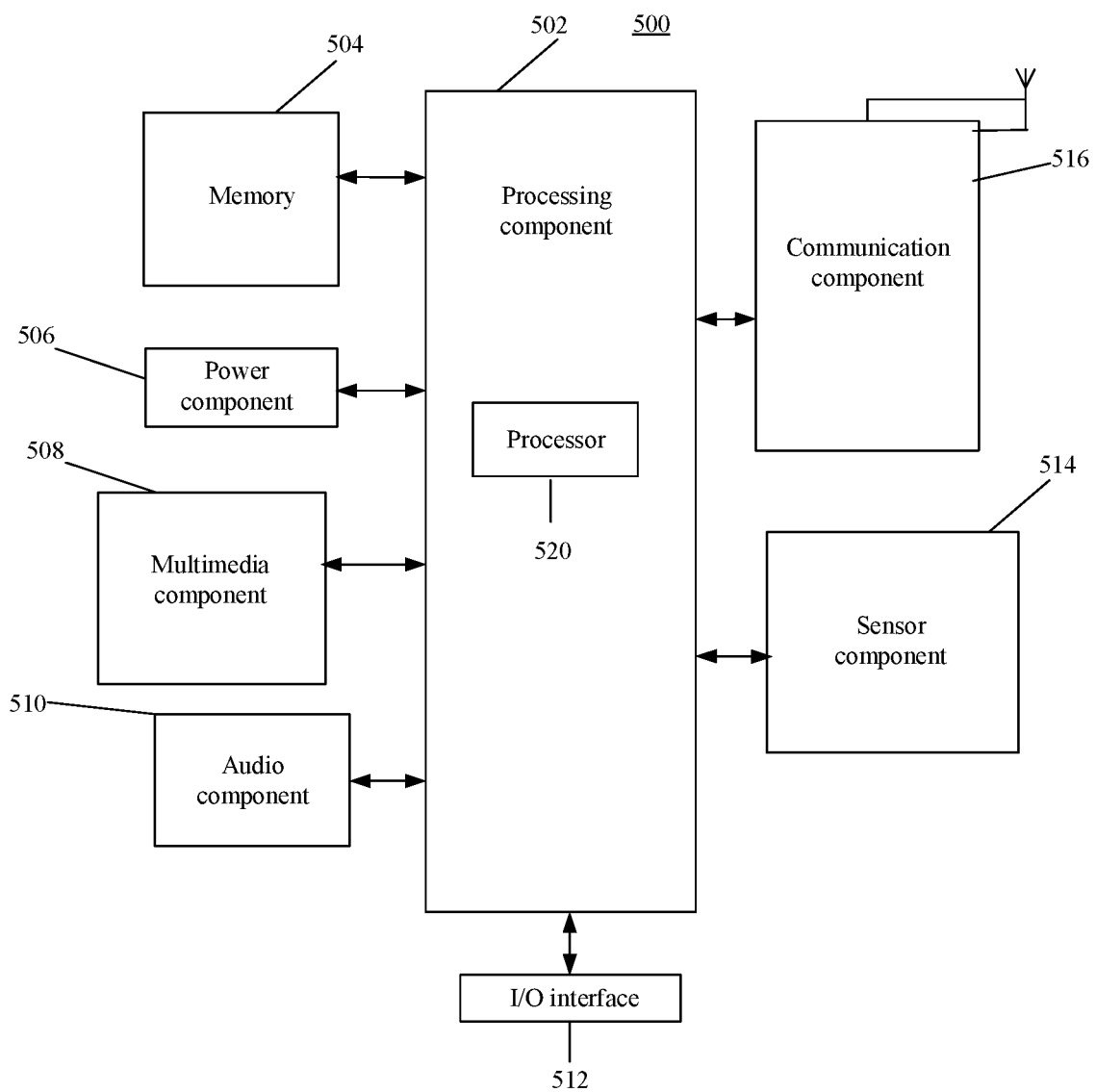
FIG. 5 illustrates a block diagram of a device according to an exemplary aspect of the present disclosure.

FIG. 5 illustrates a block diagram of a device 500 for accessing a 5G network according to an exemplary aspect of the present disclosure. For example, the device 500 may be a mobile phone, a computer, a digital broadcast terminal, a messaging device, a gaming console, a tablet, a medical device, exercise equipment, a personal digital assistant, and the like.

Referring to FIG. 5, the device 500 may include one or more of the following components: a processing component 502, a memory 504, a power component 506, a multimedia component 508, an audio component 510, an input/output (I/O) interface 512, a sensor component 514, and a communication component 516.

The processing component 502 typically controls overall operations of the device 500, such as the operations associated with display, telephone calls, data communications, camera operations, and recording operations. The processing component 502 may include one or more processors 520 to execute instructions to perform all or part of the operations in the above described methods. Moreover, the processing component 502 may include one or more modules which facilitate the interaction between the processing component 502 and other components. For example, the processing component 502 may include a multimedia module to facilitate the interaction between the multimedia component 508 and the processing component 502.

The memory 504 is configured to store various types of data to support the operation of the device 500. Examples of such data include instructions for any disclosures or methods operated on the device 500, contact data, phonebook data, messages, pictures, video, etc. The memory 504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 506 provides power to various components of the device 500. The power component 506 may include a power management system, one or more power sources, and any other components associated with the generation, management, and distribution of power in the device 500.

The multimedia component 508 includes a screen providing an output interface between the device 500 and the user. In an exemplary aspect, the screen may include a liquid crystal display (LCD) and a touch panel (IP). If the screen includes the IP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In an exemplary aspect, the multimedia component 508 includes a front camera and/or a rear camera. The front camera and/or the rear camera may receive external multimedia data when the device 500 is in an operation mode, such as a photographing mode or a video mode. Each of the front camera and the rear camera may be a fixed optical lens system or have focusing and optical zooming capabilities.

The audio component 510 is configured to output and/or input audio signals. For example, the audio component 510 includes a microphone (MIC) configured to receive an external audio signal when the device 500 is in an operation mode, such as a call mode, a recording mode, and a voice recognition mode. The received audio signal may be further stored in the memory 504 or transmitted via the communication component 516. In an exemplary aspect, the audio component 510 further includes a speaker to output audio signals.

The I/O interface 512 provides an interface between the processing component 502 and peripheral interface modules, such as a keyboard, a click wheel, buttons, and the like. The buttons may include, but are not limited to, a home button, a volume button, a starting button, and a locking button.

The sensor component 514 includes one or more sensors to provide status assessments of various aspects of the device 500. For instance, the sensor component 514 may detect an on/off status of the device 500 and relative positioning of components, such as a display and small keyboard of the device 500, and the sensor component 514 may further detect a change in a position of the device 500 or a component of the device 500, presence or absence of contact between the user and the device 500, orientation or acceleration/deceleration of the device 500 and a change in temperature of the device 500. The sensor component 514 may include a proximity sensor configured to detect presence of an object nearby without any physical contact. The sensor component 514 may also include a light sensor, such as a complementary metal oxide semiconductor (CMOS) or charge coupled device (CCD) image sensor, configured for use in an imaging application. In an exemplary aspect, the sensor component 514 may also include an acceleration sensor, a gyroscope sensor, a magnetic sensor, a pressure sensor or a temperature sensor.

The communication component 516 is configured to facilitate communication, wired or wirelessly, between the device 500 and other devices. The device 500 can access a wireless network based on a communication standard, such as WiFi, 2G, or 3G, or a combination thereof. In an exemplary aspect of the present disclosure, the communication component 516 receives a broadcast signal or broadcast associated information from an external broadcast management system via a broadcast channel. In an exemplary aspect, the communication component 516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an exemplary aspect, the device 500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In an exemplary aspect, there is also provided a non-transitory computer readable storage medium including instructions, such as included in the memory 504, executable by the processor 520 in the device 500, for performing the above method. For example, the non-transitory computer readable storage medium may be a ROM, a random access memory (RAM), a CD-ROM, a magnetic tape, a floppy disc, an optical data storage device and the like.

A non-transitory computer readable storage medium is provided. When instructions in the storage medium are executed by a processor of a mobile terminal, the mobile terminal is enabled to perform a method for accessing a 5G network. The method includes that: frequency point scanning is performed in an operating band belonging to an operator of the 5G network, and frequency point information scanned in the operating band is acquired; a 5G-supported frequency point used by the operator is selected from the frequency point information; and a cell registration process is performed through a cell with the 5G-supported frequency point to access the 5G network.

Figure 6:
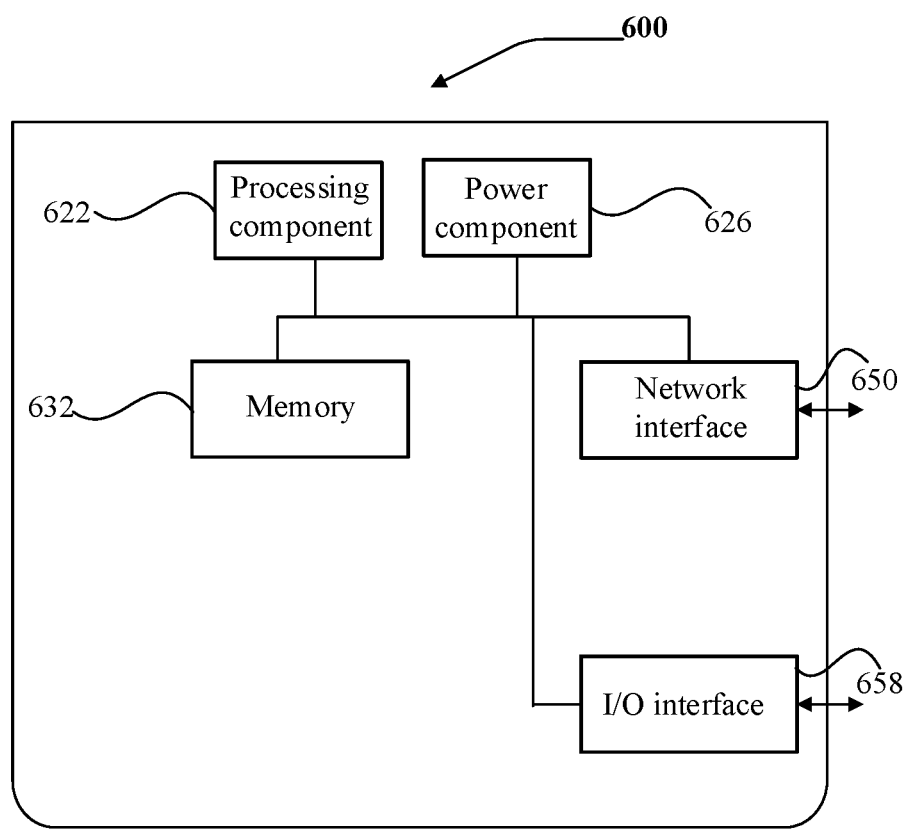
FIG. 6 illustrates a block diagram of a device according to an exemplary aspect of the present disclosure.

FIG. 6 illustrates a block diagram of a device 600 for accessing a 5G network according to an exemplary aspect of the present disclosure. For example, the device 600 may be provided as a server. Referring to FIG. 6, the device 600 includes a processing component 622, which further includes one or more processors, and a memory resource represented by a memory 632, for storing instructions executable by the processing component 622, such as application programs. The application program stored in the memory 632 may include one or more modules each corresponding to a set of instructions. In addition, the processing component 622 is configured to execute instructions to perform the above-mentioned method, which includes that: frequency point scanning is performed in an operating band belonging to an operator of the 5G network, and frequency point information scanned in the operating band is acquired; a 5G-supported frequency point used by the operator is selected from the frequency point information; and a cell registration process is performed through a cell with the 5G-supported frequency point to access the 5G network.

The device 600 may further include a power component 626 configured to perform power management of the device 600, a wired or wireless network interface 650 configured to connect the device 600 to a network, and an I/O interface 658. The device 600 may be operated based on an operating system stored in the memory 632, such as Windows Server™, Mac OS X™, Unix™, Linux™, FreeBSD™, or the like.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for accessing a fifth generation (5G) network, implemented by a terminal, the method comprising:
acquiring frequency point information by performing frequency point scanning in an operating band belonging to an operator of the 5G network;
selecting a 5G-supported frequency point used by the operator from the frequency point information: and
performing a cell registration process through a cell with the 5G-supported frequency point to access the 5G network,
wherein selecting the 5G-supported frequency point used by the operator from the frequency point information and performing the cell registration process through the cell with the 5G-supported frequency point to access the 5G network comprises:
determining whether the frequency point information includes the 5G-supported frequency point used by the operator, wherein the 5G-supported frequency point used by the operator is determined according to correspondences between operators and 5G-supported frequency points:
selecting, when the frequency point information includes at least one 5G-supported frequency point used by the operator, a frequency point having maximum signal energy from the at least one 5G-supported frequency point used by the operator, and performing the cell registration process through a cell with the 5G-supported frequency point having maximum signal enemy to access the 5G network; and
selecting, when the frequency point information does not include the 5G-supported frequency point used by the operator, a frequency point having maximum signal energy from the frequency point information, and performing the cell registration process through a cell with the frequency point having maximum signal energy to access the 5G network.

2. The method of claim 1, wherein selecting the 5G-supported frequency point used by the operator from the frequency point information comprises:
selecting a scanned frequency point having maximum signal energy from the frequency point information to perform the cell registration process through a cell with the selected frequency point to access the 5G network.

3. The method of claim 1, further comprising:
generating a frequency point list; and
adding a 5G-supported frequency point used by each operator to the frequency point list.

4. The method of claim 3, further comprising:
acquiring the 5G-supported frequency point used by the operator from the frequency point list through a radio resource control (RRC) module of the terminal.

5. The method of claim 1, further comprising:
setting a scanning priority of a band comprising the 5G-supported frequency point and belonging to the operator to high.

6. The method of claim 1. further comprising:
after accessing the 5G network, acquiring a 5G-supported frequency point used for accessing the 5G network; and
updating a frequency point list based on the acquired 5G-supported frequency point.

7. A device for accessing a fifth generation (5G) network, located in a terminal, comprising:
a processor; and
a memory configured to store instructions executable by the processor,
wherein the processor is configured to:
acquire frequency point information by performing frequency point scanning in an operating band belonging to an operator of the 5G network;
select a 5G-supported frequency point used by the operator from the frequency point information;
perform a cell registration process through a cell with the 5G-supported frequency point to access the 5G network;
determine whether the frequency point information includes the 5G-supported frequency point used by the operator, wherein the 5G-supported frequency point used by the operator is determined according to correspondences between operators and 5G-supported frequency points;
select, when the frequency point information includes at least one 5G-supported frequency point used by the operator, a frequency point having maximwn signal energy from the at least one 5G-supported frequency point used by the operator, and perform the cell registration process through a cell with the 5G-supported frequency point haying maximum signal energy to access the 5G network; and
select, when the frequency point information does not include the 5G-supported frequency point used by the operator, a frequency point having maximum signal energy from the frequency point information, and perform the cell registration process through a cell with the frequency point having maximum signal energy to access the 5G network.

8. The device of claim 7, wherein the processor is further configured to:
select a scanned frequency point having maximum signal energy from the frequency point information to perform the cell registration process through a cell with the selected frequency point to access the 5G network.

9. The device of claim 7, wherein the processor is further configured to:
  generate a frequency point list and
  add a 5G-supported frequency point used by each operator to the frequency point list.

10. The device of claim 9, wherein the processor is further configured to:
  acquire the 5G-supported frequency point used by the operator from the frequency point list through a radio resource control (RRC) module of the terminal.

11. The device of claim 7, wherein the processor is further configured to:
  set a scanning priority of a band comprising the 5G-supported frequency point and belonging to the operator to high.

12. The device of claim 7, wherein the processor is further configured to:
  acquire, after accessing the 5G network, a 5G-supported frequency point used for accessing the 5G network; and
  update a frequency point list based on the acquired 5G-supported frequency point.

13. A non-transitory computer-readable storage medium storing instructions that, when executed by a processor of a mobile terminal that is configured to access a 5G network, cause the mobile terminal to:
  acquire frequency point information by performing frequency point scanning in an operating band belonging to an operator of the 5G network;
  select a 5G-supported frequency point used by the operator from the frequency point information; and
  perform a cell registration process through a cell with the 5G-supported frequency point to access the 5G network,
  wherein when selecting the 5G-supported frequency point used by the operator from the frequency point information, and performing the cell registration process through the cell with the 5G-supported frequency point to access the 5G network, the instructions are further configured to cause the mobile terminal to:
    determine whether the frequency point information includes the 5G-supported frequency point used by the operator, wherein the 5G-supported frequency point used by the operator is determined according to correspondences between operators and 5G-supported frequency points;
    select, when the frequency point inform at includes at least one 5G-supported frequency point used by the operator, a frequency point having maximum signal energy from the at least one 5G-supported frequency point used by the operator, and perform the cell registration process through a cell swith the 5G-supported frequency point having maximum signal energy to access the 5G network; and
    select, when the frequency point information does not include the 5G-supported frequency point used by the operator, a frequency point having maximum signal energy from the frequency point information, and perform the cell registration process throuch a cell with the frequency point having maximum signal energy to access the 5G network.

14. The non-transitory computer-readable storage medium of claim 13, wherein when selecting the 5G-supported frequency point used by the operator from the frequency point information, the instructions further cause the mobile terminal to:
  select a scanned frequency point having maximum signal energy from the frequency point information to perform the cell registration process through a cell with the selected frequency point to access the 5G network.

15. The non-transitory computer-readable storage medium of claim 13, wherein the instructions further cause the mobile terminal to:
  generate a frequency point list; and
  add a 5G-supported frequency point used by each operator to the frequency point list.

16. The non-transitory computer-readable storage medium of claim 15, wherein the instructions further cause the mobile terminal to:
  acquire the 5G-supported frequency point used by the operator from the frequency point list through a radio resource control (RRC) module of the terminal.

17. The non-transitory computer-readable storage medium of claim 13, wherein the instructions further cause the mobile terminal to:
  set a scanning priority of a band comprising the 5G-supported frequency point and belonging to the operator to high.

18. The non-transitory computer-readable storage medium of claim 13, wherein the instructions further cause the mobile terminal to:
  after accessing the 5G network, acquire a 5G-supported frequency point used for accessing the 5G network; and
  update a frequency point list based on the acquired 5G-supported frequency point.

* * * * *